US00RE45021E

(19) United States
(12) Reissued Patent
Kunisetty et al.

(10) Patent Number: US RE45,021 E
(45) Date of Reissued Patent: Jul. 15, 2014

(54) METHOD AND SOFTWARE FOR PROCESSING SERVER PAGES

(75) Inventors: Sunil Kunisetty, Fremont, CA (US); Julie Basu, San Mateo, CA (US); Kwok Lun Alex Yiu, Sunnyvale, CA (US)

(73) Assignee: Oracle International Corporation, Redwood Shores, CA (US)

(21) Appl. No.: 13/599,716

(22) Filed: Aug. 30, 2012

Related U.S. Patent Documents

Reissue of:
(64) Patent No.: 7,788,649
Issued: Aug. 31, 2010
Appl. No.: 10/051,274
Filed: Jan. 22, 2002

U.S. Applications:
(60) Provisional application No. 60/294,560, filed on Jun. 1, 2001.

(51) Int. Cl.
*G06F 9/44* (2006.01)
*G06F 9/45* (2006.01)

(52) U.S. Cl.
USPC ..... 717/137; 717/115; 719/311

(58) Field of Classification Search
USPC ..... 717/137
See application file for complete search history.

(56) References Cited

U.S. PATENT DOCUMENTS

| | | | | |
|---|---|---|---|---|
| 6,148,302 | A * | 11/2000 | Beylin et al. | 1/1 |
| 6,173,276 | B1 * | 1/2001 | Kant et al. | 706/50 |
| 6,463,578 | B1 * | 10/2002 | Johnson | 717/124 |
| 6,591,272 | B1 * | 7/2003 | Williams | 707/102 |
| 6,636,863 | B1 * | 10/2003 | Friesen | 707/102 |
| 6,647,544 | B1 * | 11/2003 | Ryman et al. | 717/124 |
| 6,675,354 | B1 * | 1/2004 | Claussen et al. | 715/205 |
| 6,964,014 | B1 * | 11/2005 | Parish | 715/205 |
| 2002/0004813 | A1 * | 1/2002 | Agrawal et al. | 709/201 |
| 2003/0074400 | A1 * | 4/2003 | Brooks et al. | 709/203 |

* cited by examiner

*Primary Examiner* — James D Rutten
(74) *Attorney, Agent, or Firm* — Hickman Palermo Truong Becker Bingham Wong LLP

(57) ABSTRACT

A method and software for processing a server page is disclosed, in which a resource file is generated for each server page. The resource contains the markup text of the server page. When the server page is translated into a servlet, a static class initializer is included to read the resource file and initialize static class variables with the markup text. The initialized class is then loaded into a shored memory that is accessible to different processes.

14 Claims, 5 Drawing Sheets

METHOD AND SOFTWARE FOR PROCESSING SERVER PAGES

Matter enclosed in heavy brackets [ ] appears in the original patent but forms no part of this reissue specification; matter printed in italics indicates the additions made by reissue.

RELATED APPLICATIONS

The present application claims the benefit of U.S. Provisional Patent Application Ser. No. 60/294,560 filed on Jun. 1, 2001, the contents of which are hereby incorporated by reference.

FIELD OF THE INVENTION

The present invention relates to computer systems and more particularly to a method and software for processing server pages.

BACKGROUND OF THE INVENTION

The introduction of the World Wide Web is revolutionizing the way information and applications are distributed and used. Initially, the World Wide Web employed a static approach for disseminating information, in which web pages containing the information are annotated in a markup language such as HTML (Hypertext Markup Language) and stored on a web server. In response to HTTP (Hypertext Transfer Protocol) requests from a user, the web server transmits the web page containing the marked up information to the user's rendering agent such as browser. When the browser receives the web page containing the information to be displayed along with the markup, the browser renders the information on the screen in accordance with the markup annotations embodied in the web page.

In the static web page approach, the content of the web page is determined by the author ahead of time, before the user requests the web page, and does not change in response to the user's actions. Accordingly, web sites employing static web pages were limited in their interactively and usefulness. An early attempt to provide interactivity in web pages is known as CGI (Common Gateway Interface), in which a web page is generated dynamically in response to a user's HTTP request. In CGI, the web server executes, in response to the HTTP request, a locally resident program (typically a Perl script) that receives parameters from the HTTP request and outputs on the fly the markup for a web page. The generated web page is then transmitted over the Internet to the user's browser and rendered.

CGI technology suffers many disadvantages, particularly in terms of efficiency and convenience. For example, every time an HTTP request is made that requires CGI, a program is loaded and executed. Initiating programs requires much overhead in terms of starting a new process, initializing memory, and establishing a connection to a database. This overhead reduces the performance and responsiveness of the web server. In addition, CGI programs are difficult to program because they are coded in a low-level computer language like C or in an arcane scripting language like Perl.

A more efficient approach employs "servlets," which are short programs that are resident and executed on the web server. Java Servlets are servlets coded in the Java programming language and are usually compiled into bytecoded instructions that interpreted by an instance of a Java virtual machine. Like a CGI script, the servlet generates and outputs a web page based on data submitted by the user. Unlike CGI scripts, however, Java Servlets are processed by an instance of an already running Java virtual machine and require much less overhead in being loaded and executed. As a result, servlet technology is rapidly eclipsing CGI technology on the World Wide Web.

Although the Java programming language is easier to use and less arcane than typical CGI scripting language such as Perl, it is still inconvenient for many web designers to create servlets to generate their dynamic web pages. For example, many dynamic web pages include large areas of static content with the dynamic content being limited to a few locations. For this reason, server pages technology has been developed, which enables a web designer to embed short code fragments into an otherwise static HTML web page. If the code fragments are in Java, the technology is commonly referred as Java Server Pages (JSP). A Java Server Page is translated by the web server into a corresponding Java Servlet that includes the static HTML code.

Java Servlets that are generated from Java Server Pages include large amounts of static text. In order to support a large number of users simultaneously (scalability), it is vital for the static HTML text of a Java Server Page to be shared by different users. A significant constraint for user scalability is the size of the memory "footprint" that each session consumes. For example, a server system may have 100 Mb of memory for supporting all the user sessions. If the session memory footprint is 1 Mb, then only 100 user sessions can be supported at one time, but if 500 Kb of the 1 Mb session memory footprint can be shared between the different sessions, then 500 Kb of the total 100 Mb can be reserved as a global shared read-only memory, and the remaining the 99.5 Mb would available for the individual session memories. Since the session memory requirements has dropped to 500 Kb, a total of 199 user sessions can now be supported. Consequently, session memory reduction by sharing is a promising approach for improving scalability of the multi-user runtime environment.

The efficiency and scalability of programs executed by a web server are crucial to the performance and, ultimately, the profitability of a company's website. Due to the increasing popularity of the World Wide Web and Java Server Pages technology, there is a constant need for any improvements in the efficiency and scalability of web servers in general and Java Server Pages in particular.

SUMMARY OF THE INVENTION

The present invention stems from the realization that the standard Java mechanism for handling and sharing literal strings of text is a major performance bottleneck in the specific case of Java Servlets generated from Java Server Pages. This bottleneck results from the Java specification's requirement that string literals be "interned," so as to share unique instances of strings in a Java program (§3.10.5). Interned Java literal strings are stored in an internal data structure known as an intern table. In order to share strings among different users and ensure the integrity of the intern table, it is necessary to synchronize access to the intern table among the different users, which is slow and inefficient. JSP-generated Java Servlets, however, include large amounts of static text that need to be shared for scalability reasons but, if interned, are slow to access.

This performance bottleneck for JSP-generated Java Servlets is addressed by the present invention, in which the literal strings for the markup text is stored, not in Java literal strings, but in a resource file generated for each Java Servlet. In one implementation, the JSP-generated Java Servlet is configured to contain an inner class that includes initialization code that reads the markup text from the resource file and copies the markup text into static Java char arrays. The inner class is then "hotloaded," in which the class instructions and pre-initialized static variables are loaded into a shared, read-only memory that is globally available to different user sessions on the web server without synchronization. After a class is hotloaded, the class's instructions and pre-initialized static variables are available, without synchronization, to Java applications. By avoiding the use of Java literal strings, which require interning and synchronization, access to the static markup text of JSP-generated Java Servlets is much faster, which improves the performance of Java Servlets generated from Java Server Pages.

Accordingly, one aspect of the present invention relates to a method and software for compiling a page containing markup text into an application that outputs markup in response to a request from a user. The method involves pre-initializing a static variable of a class to contain the markup text and loading the class containing the pre-initialized static variable into a shared, read-only memory. The markup text may be stored in a resource file associated with the application, and pre-initializing the static variable may include reading the markup text from the resource file and initializing the static variable of the class based on the read markup text.

Another aspect of the invention relates to method and software for compiling a page containing markup text into an application that outputs markup in response to a request from a user. The application includes instructions, in which, first time the application is executed, a class containing a static variable that was pre-initialized to contain the markup text is loaded into a shared, read-only memory. A subsequent time the application is executed, the markup text is accessed in the shared, read-only memory.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for processing server pages are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Deployment Environment

Figure 1:
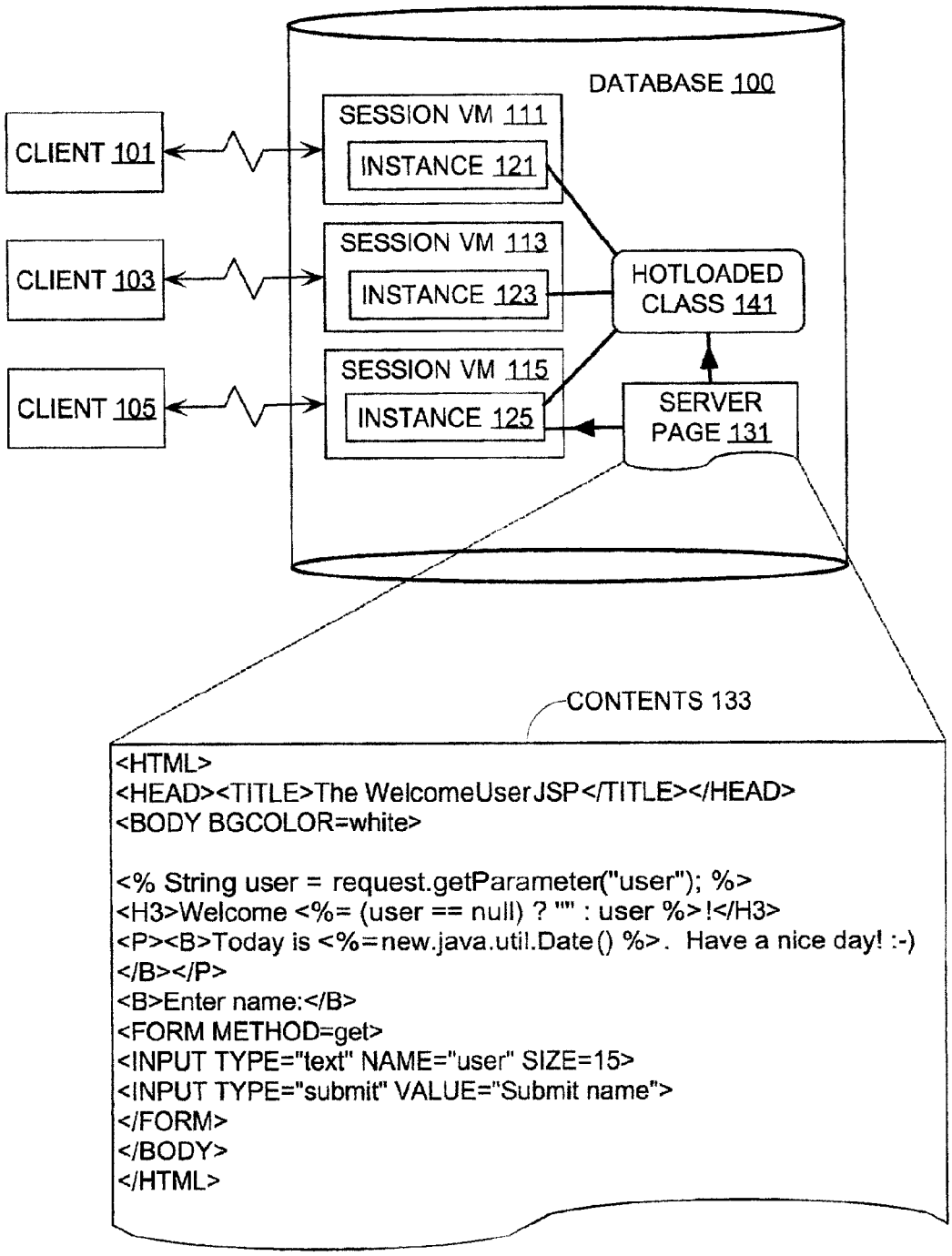
FIG. 1 is a schematic diagram of a web server in accordance with an embodiment of the present invention.

FIG. 1 is a schematic diagram of a deployment environment that includes a web server 100 in communication with several clients 101, 103, and 105 via Hypertext Transfer Protocol (HTTP) over a network. In one implementation, the network may the global packing-switching network commonly known as the Internet, and the clients 101, 103, and 105 may be browsers executing on computer systems connected to the Internet. Although three clients 101, 103, and 105 are illustrated, the present invention is not so limited and may work with any number of clients.

Each client 101, 103, and 105 has initiated a session with a corresponding instance of Java virtual machine 111, 113, and 115, which are capable of executing Java programs on the web server 100. The web server 100 also stores various web and server pages, including server page 131, which contains both static markup text and coded fragments embedded among the static markup text. By way of example, FIG. 1 shows what can be the contents 133 of a server page 313. In this example, the server page contents 133 includes both static HTML text and, in bold, embedded Java code between the delimiters <% and %>. The web server also stores the preloaded markup text 141 of the server page 131 in a shared memory accessible to different users, sessions, and processes.

The clients 101, 103, and 105 have access to the server page 131, for example, by a Uniform Resource Locator (URL) that identifies a location or path of the server page 131. When one of the clients 101, 103, and 105 requests the server page 131, for example by URL, the web server 100 initiates a corresponding servlet instance 121, 123, and 125, which executes the code obtained by translating the server page 131. When executed, the servlet instance 121, 123, and 125 produces markup text by combining the pre-loaded static markup text 141 stored in a pre-initialized class variable with results of executing the code snippets embedded in the server page 131. The produced markup text is transmitted to the corresponding client 101, 103, and 105 and rendered.

Hotloading Static Texts from Server Pages

Figure 2:
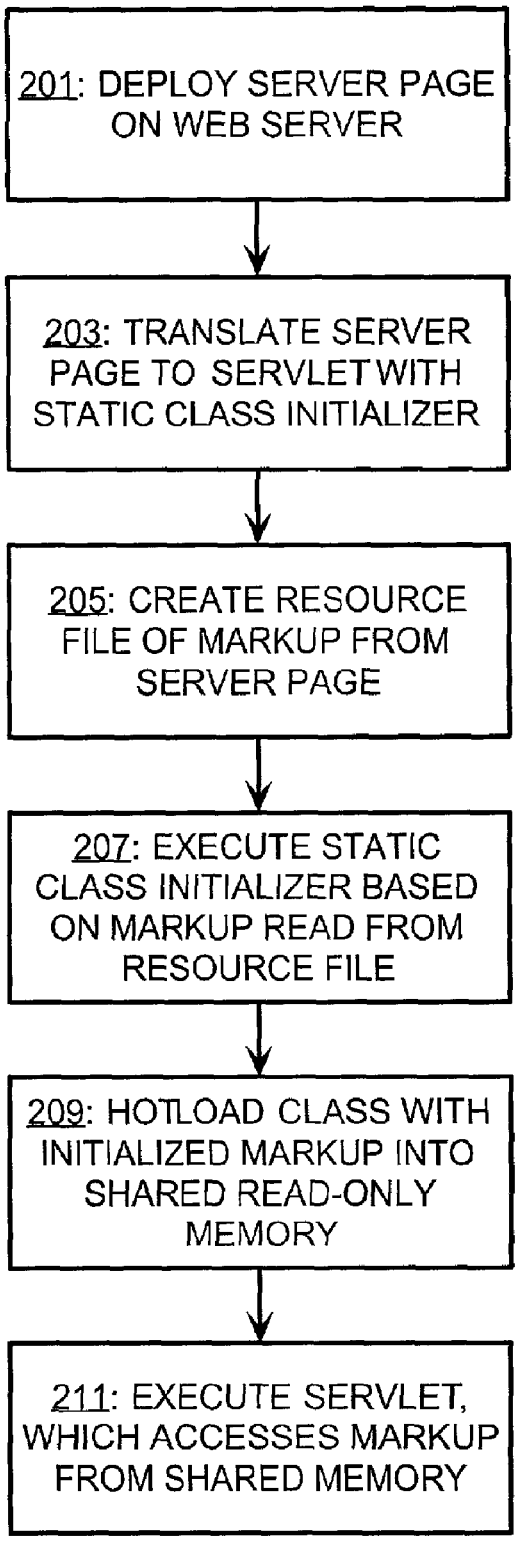
FIG. 2 is a flowchart illustrating the operation of one embodiment of the present invention.

FIG. 2 is a flowchart illustrating how the static markup text came to be pre-loaded in a shared memory of the web server 100. At step 201, a server page 131 is deployed on the web server 100. As part of the deployment, the server page 131 is translated into a servlet (step 203) and a corresponding resource file is generated to hold all the static markup text of the server 131 (step 205). The translated servlet include code to combine the static markup text with the results of the code embedded in the server page 131. The translated servlet also includes a class that has a two-dimensional static final character array and a static class initializer to set up the array. One dimension of the static character array corresponds to the lines of the server page 131, and the other dimension to the columns of the server page 131.

When the servlet class is first used by any of the servlet instances 121, 123, and 125, the static class initializer code is executed (step 207). The static class initializer, when executed, reads each of line of the resource file and initializes the corresponding static character array with the read line. At step 209, the class with its static character arrays being initialized from the resource file is then "hotloaded" into shared memory for use by any session. Implementation details of hotloading are described in the following section.

When a servlet instance 121, 123, and 125 is executed, the static markup text in the shared memory is accessed and used to produce the markup code generated by the servlet. Because the static markup text is not stored as Java literal strings in the translated servlet, the overhead associated with interning the strings and maintaining the integrity of the intern table for different users is eliminated, thereby significantly improving the performance of the server pages. Furthermore, scalability is maintained, because the static markup text is shared among different sessions. As the hotloaded class is referenced, even in other sessions, the static class initializer is not rerun and the session has instant access to the static final variables that represent the static class.

Hotloading Memory Model

Figure 3:
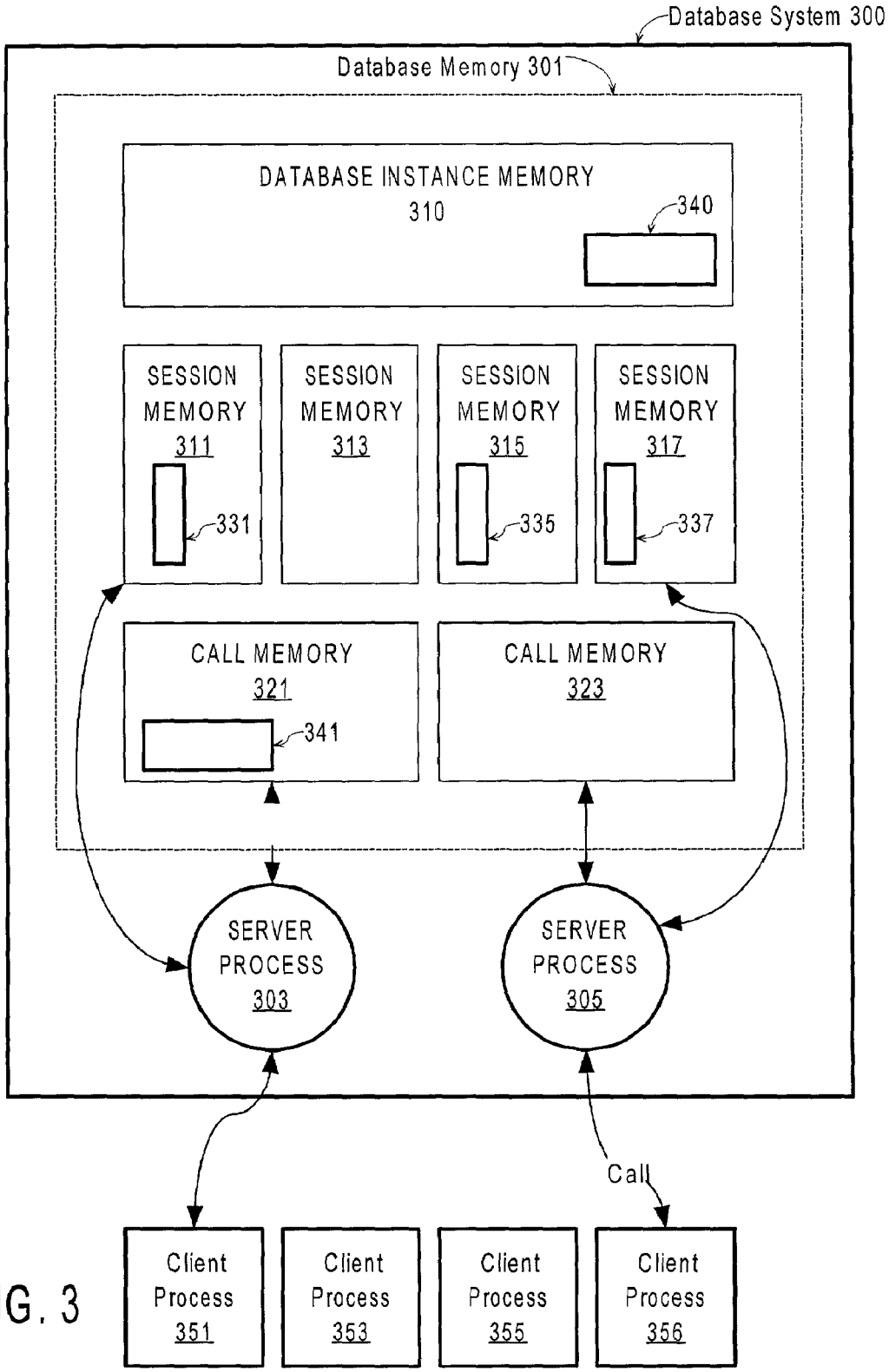
FIG. 3 depicts a memory model for a database system in accordance with an embodiment of the present invention.

One embodiment of the present invention employs a relational database system that is enabled to respond to HTTP requests. FIG. 3 schematically illustrates such a web-enabled database system 400 with which a run-time environment for a language such as Java is used. In the illustrated configuration, client processes 351, 353, 355, and 357 establish sessions with the database system 300. This client processes 351, 353, 355, and 357 may be located on any computer system accessible to the database system 300, for example, over the Internet.

A database session refers to the establishment of a connection between a client and the database system through which a series a calls may be made. As long as the client remains connected in the database session, the client and the associated database session are considered "active." Active clients can submit calls to the database system 300 to request the database system 300 to perform tasks. One example of a call is a query in accordance with the Structured Query Language (SQL), and another example is a method invocation of a Java object or class, defined for performing a database task for database system 300. In addition, the client processes 351, 353, 355, and 357 may submit HTTP requests to the database system 300.

Database system 300 comprises, among other components, a database memory 301 for storing information useful for processing calls and a number of server processes 303 and 305 for handling individual calls. These server processes 303 and 305 may involve initiating an instance of a Java Virtual Machine to perform actions programmed in Java. The database memory 301 includes various memory areas used to store data used by server processes 303 and 305. These memory areas include a database instance memory 310, session memories 311, 313, 315, and 317. and call memories 321 and 323. It is to be understood that the number of the session memories and call memories in FIG. 3 is merely illustrative and, in fact, the number of such memories will vary over time as various clients make various calls to the database system 300.

The database instance memory 310 is a shared memory area for storing data that is shared concurrently by more than one process. For example, shared memory area may be used store the read-only data and instructions (e.g. bytecodes of Java classes) that are executed by the server processes 303 and 305. For example, the database instance memory 310 holds the read-only data and instructions for the inner class of a servlet and its static class variables. When the static markup text of a server page is stored in the database instance memory 310 that static markup text is accessible to the server processes 303 and 305. The database instance memory 310 is typically allocated and initialized at boot time of the database system 300, before clients connect to the database system 300. Throughout the operation of the database system 300, pre-initialized classes with read-only data and instructions may be loaded into the database instance memory 310.

When a database session is created, an area of the database memory 301 called "Session memory" is allocated to store information for the database session. As illustrated in FIG. 2, session memories 311, 313, 315, and 317 have been allocated for clients 351, 353, 355, and 357, respectively, for each of which a separate database session has been created. Session memories 311, 313, 315, and 317 are a shared memory used to store static data, i.e., data associated with a user that is preserved for the duration of a series of calls, especially between calls issued by a client during a single database session. Java class variables are one example of such static data.

A call memory, such as call memory 321, is used to store data that is bounded by the lifetime of a call. When client 351 submits a call to the database system 300, one of server processes 303 or 305 is assigned to process the call. For the duration of the call, the server process is allocated a call memory for storing data and other information for use in processing the call. For example, server process 303 uses call memory 321 and session memory 311 for processing a call submitted by client process 351.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handle its various calls. At any given time, the number of calls requiring execution by a server process is typically much fewer than the current number of active clients. Thus, database system 300 is typically configured to execute fewer server processes than the maximum number of active clients.

Figure 4:
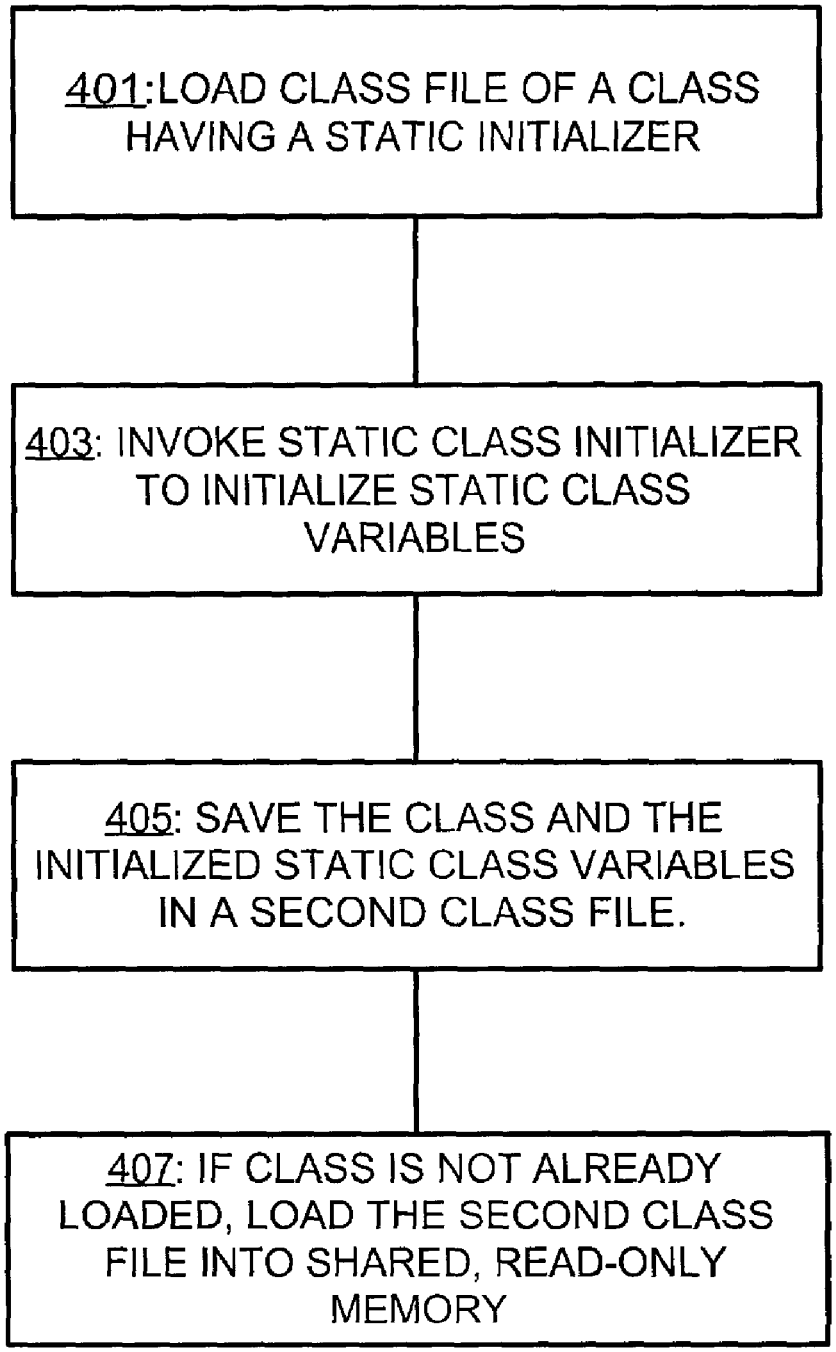
FIG. 4 is a flowchart illustrating the operating of hotloading a class in accordance with an embodiment of the present invention.

Some static class variables that are good candidates for sharing because they are not modified after construction still require execution of a static class initializer to be properly constructed. One example includes initializing the static class variables of a servlet to include the static markup text that was saved in a resource file. FIG. 4 is a flowchart for a method of managing a run-time environment, carried out during construction of objects for later loading to a shared read-only memory in a server of the computer system.

At step 401, a class file, which in one embodiment is the compiled form of a Java class, is loaded into the shared read-only object memory, for a specified class. The specified class includes a static class variable and a static initializer, which is used to initialize the static class variable. Although loading a single class file is discussed for purposes of explanation, the present invention is not so limited. In fact, more than one class file may be loaded, and the techniques described herein may be applied to other initialized variables.

In step 403, the static initializer is invoked to construct the static class variable in a writable memory, such as call or session memory. In the cases of a servlet generated from a server page, initializing the static class variables includes reading the markup text from a resource file.

The class along with the initialized static class variable, in step 405, are then saved in a second class file that shadows the class file, with a name related to that of the class file but with a different extension, path, or other filename component. The second class file with the saved, constructed class object is loaded into a globally shared memory in step 407, such as a shared read-only memory. Thus, the values of constructed static class objects can be placed into the globally shared memory via the second class file.

Alternatively a specific class can be designated, for example, by a system administrator specification, for migration to shared read-only memory. The designated class, if not already in shared memory, is then migrated into shared memory and is stored in the database. Later, the class is loaded from the database into the shared memory by looking up the name of the class in the database. The designation and migration may be performed in one process by the system administrator, and the loading may be performed in one or more subsequent processes by other users, thereby saving the overhead involved in constructing the object.

Further details of the implementation and use of this mechanism may be found in the commonly assigned, co-pending patent application Ser. No. 09/512,618, entitled "Method and apparatus for managing shared memory in a run-time environment," filed on Feb. 25, 2000 by Harlan Sexton et al., now U.S. Pat. No. 6,829,761 the contents of which are hereby incorporated by reference in their entirety.

Hardware Overview

Figure 5:
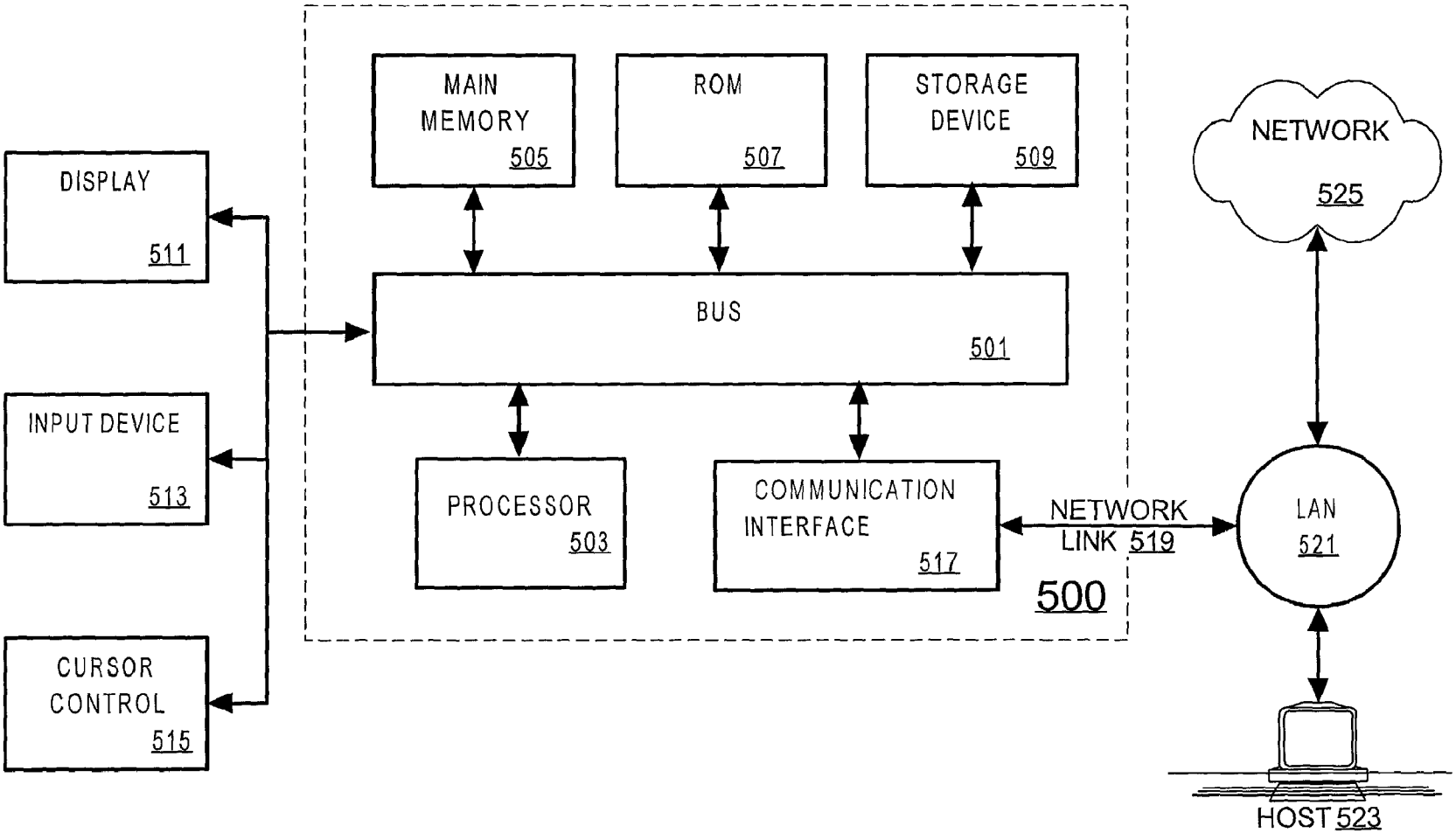
FIG. 5 depicts a computer system that can be used to implement an embodiment of the present invention.

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, processing server pages is provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging an application program for implementing an embodiment of the present invention through the network 525, local network 521 and communication interface 517. The processor 503 may execute the transmitted code while being received and/or store the code in storage device 539, or other non-volatile storage for later execution. In this manner, computer system 500 may obtain application code in the form of a carrier wave.

The term "computer-readable medium" as used herein refers to any medium that participates in providing instructions to the processor 505 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A computer-implemented method of dynamically generating web pages, said method comprising:

analyzing a page that includes static markup text and a set of code instructions executable on a server;

extracting the static markup text from the page and storing the static markup text in a resource file;

generating a servlet class for the page based on the set of code instructions, wherein the servlet class comprises *an inner class that includes* a static *class* initializer for initializing a static [class] array *of characters* for the servlet class, and wherein the servlet class does not include the static markup text;

in response to a first use of the servlet class by any instance of the servlet class:

invoking the static class initializer of the [servlet] *inner* class, wherein the invoking of the static class initializer of the [servlet] *inner* class causes the static markup text to be read from the resource file, and the static [class] array *of characters* to be initialized with the static markup text;

hotloading [a copy of the servlet class] *an instance of the inner class* comprising the static [class] array *of characters* initialized with the static markup text into shared memory;

in response to each request*,* of a plurality of requests *received from a plurality of clients,* for the page [from a plurality of clients], performing the steps of:

instantiating a distinct instance of the servlet class on the server, wherein instantiating each *distinct* instance of the servlet class does not create another copy of the static markup text;

executing said distinct instance of the servlet class, wherein execution of each *distinct* instance of the [server] *servlet* class generates a compiled page by combining the static markup text that resides in the shared memory with results produced by executing the set of code instructions; and sending the compiled page to a client*, from the plurality of clients,* that requested the page;

wherein the method is performed by one or more computing devices.

2. A computer-implemented method according to claim 1, wherein:

the static markup text includes information to be displayed to a user and an annotation instructing a user agent how to render the information to be displayed to the user; and the static markup text output by the executing servlet class includes the annotation.

[3. A computer-implemented method according to claim 1, wherein the servlet class includes an inner class.]

4. A computer-implemented method according to claim [3] *1*, wherein the step of [loading a copy of the static markup text includes hot-loading] *hotloading* an instance of the inner class *comprises storing the static array of characters in a database instance memory*.

[5. A computer-implemented method according to claim 4, wherein the inner class comprises an array of characters.]

6. A method of initiating a first instance of an application that shares a set of static markup text with other instances of the application, [wherein the first instance of the application is generated by compiling code from a page that contains both the code and the set of static markup text in response to a request from one or more users,] *wherein the first instance of the application is generated by compiling code from a page that contains both the code and the set of static markup text in response to a request from one or more users,* said method comprising:

executing instructions to instantiate the first instance of the application, wherein said instructions are stored on a non-transitory computer-readable storage medium, said instructions that, when executed, cause one or more processors to perform the steps of:

analyzing [the] *a* page*, which contains both the code and the set of static markup text,* to extract the set of static markup text*;*

[and] storing the set of static markup text in a resource file;

generating a servlet class for the page based on the code from the page, wherein the servlet class comprises *an inner class that includes* a static *class* initializer for initializing a [set of] static [class] array *of characters* for the servlet class, and wherein the servlet class does not include the set of static markup text;

in response to a first use of the servlet class by any instance of the servlet class:

invoking the static class initializer of the [servlet] *inner* class, wherein the invoking of the static class initializer of the [servlet] *inner* class causes the set of static markup text to be read from the resource file, and the static [class] array *of characters* to be initialized with the set of static markup text;

hotloading [a copy] *an instance* of the [servlet] *inner* class comprising the static [class] array *of characters* initialized with the set of static markup text into shared, read-only memory;

in response to each request, of a plurality of requests *received from one or more users,* for the page [from the one or more users], performing the steps of:

instantiating a distinct instance of the servlet class, wherein instantiating each *distinct* instance of the servlet class does not create another copy of the set of static markup text;

executing said distinct instance of the servlet class, wherein execution of each *distinct* instance of the [server] *servlet* class generates a compiled page [based on the copy of] by combining the set of static markup text that resides in the shared, read-only memory with results produced by executing the [set of] code [instructions];

sending the compiled page to a client that requested the page; and accessing the set of static markup text in the shared, read-only memory when the code from the first instance of the application is executed;

wherein the method is performed by one or more computing devices.

7. A method according to claim 6, wherein the servlet class is not loaded into the shared, read-only memory when the other instances of the application are executed.

8. A method according to claim 6, wherein:

the set of static markup text includes information to be displayed to a user and an annotation instructing a user agent how to render the information to be displayed to the user; and the set of static markup text output by the application includes the annotation.

[9. A method according to claim 6, wherein the servlet class includes an inner class.]

10. A method according to [claim 9] *claim 6* wherein the step of [loading a copy of the set of the static markup text includes hot-loading] *hotloading* an instance of the inner class *comprises storing the static array of characters in a database instance memory*.

[11. A method according to claim 10, wherein the inner class comprises an array of characters.]

12. A non-transitory computer-readable storage medium storing instructions that, when executed, cause one or more processors to perform a method for sharing static markup text from a page among a plurality of users in response to requests from said plurality of users, said method comprising:

analyzing a page that includes static markup text and a set of code instructions executable on a server;

extracting the static markup text from the page and storing the static markup text in a resource file;

generating a servlet class for the page based on the set of code instructions, wherein the servlet class comprises *an inner class that includes* a static *class* initializer for initializing a static [class] array *of characters* for the servlet class, and wherein the servlet class does not include the static markup text;

in response to a first use of the servlet class by any instance of the servlet class:

invoking the static class initializer of the [servlet] *inner* class, wherein the invoking of the static class initializer of the [servlet] *inner* class causes the static markup text to be read from the resource file, and the static [class] array *of characters* to be initialized with the static markup text;

hotloading [a copy of the servlet class] *an instance of the inner class* comprising the static [class] array *of characters* initialized with the static markup text into shared memory;

in response to each request, of a plurality of requests *received from a plurality of clients,* for the page [from a plurality of clients], performing the steps of:

instantiating a distinct instance of the servlet class on the server, wherein instantiating each *distinct* instance of the servlet class does not create another copy of the static markup text;

executing said distinct instance of the servlet class, wherein execution of each *distinct* instance of the [server] *servlet* class generates a compiled page by combining the static markup text that resides in the shared memory with results produced by executing the set of code instructions; and sending the compiled page to a client, *from the plurality of clients,* that requested the page.

13. The non-transitory computer-readable storage medium of claim 12, wherein:

the static markup text includes information to be displayed to a user and an annotation instructing a user agent how to render the information to be displayed to the user; and the static markup text output by the executing servlet class includes the annotation.

[14. A non-transitory computer-readable storage medium according to claim 12, wherein the servlet class includes an inner class.]

15. A non-transitory computer-readable storage medium according to claim [14] *12*, wherein the step of [loading a copy of the static markup text includes hotloading] *hotloading* an instance of the inner class *comprises storing the static array of characters in a database instance memory*.

[16. A non-transitory computer-readable storage medium according to claim 15, wherein the inner class comprises an array of characters.]

17. A non-transitory computer-readable storage medium storing instructions that, when executed, cause one or more processors to perform a method of initiating a first instance of an application that shares a set of static markup text with other instances of the application, [wherein the first instance of the application is generated by compiling code from a page that contains both the code and the set of static markup text in response to a request from one or more users,] *wherein the first instance of the application is generated by compiling code from a page that contains both the code and the set of static markup text in response to a request from one or more users,* said method comprising:

executing instructions to instantiate the first instance of the application;

wherein the instructions to instantiate the first instance of the application include:

analyzing [the] *a* page, *which contains both the code and the set of static markup text,* to extract the set of static markup text;

[and] storing the set of static markup text in a resource file;

generating a servlet class for the page based on the code from the page, wherein the servlet class comprises *an inner class that includes* a static *class* initializer for initializing [a] static [class] array *of characters* for the servlet class, and wherein the servlet class does not include the static markup text;

in response to a first use of the servlet class by any instance of the servlet class:

invoking the static class initializer of the [servlet] *inner* class, wherein the invoking of the static class initializer of the [servlet] *inner* class causes the set of static markup text to be read from the resource file, and the static [class] array *of characters* to be initialized with the set of static markup text;

hotloading [a copy] *an instance* of the [servlet] *inner* class comprising the static [class] array *of characters* initialized with the set of static markup text into shared, read-only memory;

in response to each request of a plurality of requests, *received from one or more users,* for the page [from the one or more users], performing the steps of:

instantiating a distinct instance of the servlet class, wherein instantiating each *distant* instance of the servlet class does not create another copy of the static [class] array *of characters* initialized with the set of static markup text;

executing said distinct instance of the servlet class, wherein execution of each *distant* instance of the [server] *servlet* class generates a compiled page by combining the set of static markup text that resides in the shared, read-only memory with results produced by executing the [set of] code [instructions];

sending the compiled page to the user that requested the page; and accessing the static [class] array *of characters* initialized with the set of static markup text in the shared, read-only memory when the code from the first instance of the application is executed.

18. The non-transitory computer-readable storage medium of claim 17, wherein the servlet class is not loaded into the shared, read-only memory when the other instances of the application are executed.

19. The non-transitory computer-readable storage medium of claim 17, wherein:

the set of static markup text includes information to be displayed to a user and an annotation instructing a user agent how to render the information to be displayed to the user; and the set of static markup text output by the application includes the annotation.

[20. A non-transitory computer-readable storage medium according to claim 17, wherein the servlet class includes an inner class.]

21. A non-transitory computer-readable storage medium according to claim [20] *17*, wherein the step of [loading a copy of the set of the static markup text includes hot-loading] *hotloading* an instance of the inner class *comprising storing the static array of characters in a database instance memory*.

[22. A non-transitory computer-readable storage medium according to claim 21, wherein the inner class comprises an array of characters.]

* * * * *

UNITED STATES PATENT AND TRADEMARK OFFICE

CERTIFICATE OF CORRECTION

PATENT NO. : RE45,021 E
APPLICATION NO. : 13/599716
DATED : July 15, 2014
INVENTOR(S) : Kunisetty et al.

It is certified that error appears in the above-identified patent and that said Letters Patent is hereby corrected as shown below:

In the Specification

In column 5, line 60, delete "317." and insert -- 317, --, therefor.

In column 8, line 24, delete "Model" and insert -- Mode --, therefor.

In the Claims

In column 9, line 64, in Claim 1, delete "hotloading" and insert -- *hot*loading --, therefor.

In column 10, line 49, in Claim 6, delete "and" and insert -- *and* [a] --, therefor.

In column 12, line 55, in Claim 17, delete "and" and insert -- *and* [a] --, therefor.

In column 12, line 63, in Claim 17, delete "[a]" and insert -- [a set of] --, therefor.

Signed and Sealed this
Twenty-fourth Day of February, 2015

Michelle K. Lee

Michelle K. Lee
*Deputy Director of the United States Patent and Trademark Office*